(12) United States Patent
Wurmthaler et al.

(10) Patent No.: US 8,342,541 B2
(45) Date of Patent: Jan. 1, 2013

(54) APPARATUS AND METHOD FOR ACTIVE SPRING SUSPENSION OF A VEHICLE COMPONENT

(75) Inventors: Christoph Wurmthaler, Effeltrich (DE); Alexander Kuehnlein, Dittenheim (DE); Erwin Haller, Birgland (DE); Jens Kolb, Koenigstein (DE)

(73) Assignee: Grammer, AG, Amberg (DE)

( * ) Notice: Subject to any disclaimer, the term of this patent is extended or adjusted under 35 U.S.C. 154(b) by 951 days.

(21) Appl. No.: 12/327,683

(22) Filed: Dec. 3, 2008

(65) Prior Publication Data

US 2009/0179390 A1 Jul. 16, 2009

(30) Foreign Application Priority Data

Dec. 4, 2007 (DE) .................. 10 2007 058 652
Dec. 21, 2007 (DE) .................. 10 2007 062 927
Nov. 21, 2008 (DE) .................. 10 2008 058 409

(51) Int. Cl.
*B60G 17/015* (2006.01)

(52) U.S. Cl. ............. 280/5.515; 280/124.157; 248/636; 267/131; 267/137

(58) Field of Classification Search ............... 180/89.12, 180/89.13, 89.14; 188/266.1, 266.2, 282.3, 188/282.4; 248/550, 631, 636; 267/131, 267/133; 280/5.507, 5.513, 5.514, 5.515, 280/5.517, 5.518, 5.519, 124.157; 296/35.1, 296/190.04, 190.07; 701/37, 38, 48
See application file for complete search history.

(56) References Cited

U.S. PATENT DOCUMENTS 3,466,055 A 9/1969 Keijzer
3,762,769 A 10/1973 Poschl
(Continued)

FOREIGN PATENT DOCUMENTS

DE 6800401 3/1969
(Continued)

OTHER PUBLICATIONS

Kern et al., Vehicle seat for a commercial vehicle, Sep. 21, 2005, EPO, EP 1 577 156 A2, English Abstract.*

(Continued)

*Primary Examiner* — Joseph Rocca
*Assistant Examiner* — James English
(74) *Attorney, Agent, or Firm* — Lowe Graham Jones PLLC

(57) ABSTRACT

The invention relates to a vehicle comprising a vehicle component moveable in an oscillating manner with respect to a first vehicle component, and a first measuring means for measuring at least one acceleration measuring value of said first vehicle component with respect to a ground surface, wherein a calculating means is provided for determining an optimum acceleration value of said second vehicle component to be applied at the moment of the presence of the acceleration measuring value, and at least one actuator arranged between the first and second vehicle components, with control and closed-loop control units, for minimizing a deviation of a real acceleration value of said second vehicle component from the optimum acceleration value by using at least one available spring path.

10 Claims, 10 Drawing Sheets

U.S. PATENT DOCUMENTS

| | | | |
|---|---|---|---|
| 3,966,223 A | 6/1976 | Carr | |
| 4,023,657 A | 5/1977 | Trzoska | |
| 4,193,629 A | 3/1980 | Merkle | |
| 4,418,955 A | 12/1983 | Muncke et al. | |
| 4,451,079 A | 5/1984 | Takahashi | |
| 4,463,839 A | 8/1984 | Ashiba | |
| 4,600,215 A | 7/1986 | Kuroki et al. | |
| 4,634,142 A | 1/1987 | Woods et al. | |
| 4,645,042 A | 2/1987 | Inoue et al. | |
| 4,700,971 A | 10/1987 | Doi et al. | |
| 4,726,604 A | 2/1988 | Asami et al. | |
| 4,729,580 A | 3/1988 | Buma et al. | |
| 5,004,206 A | 4/1991 | Anderson | |
| 5,088,760 A * | 2/1992 | Kakizaki et al. | 280/5.515 |
| 5,217,210 A | 6/1993 | Schiitzner | |
| 5,234,203 A | 8/1993 | Smith | |
| 5,255,935 A | 10/1993 | Imani | |
| 5,324,069 A | 6/1994 | Ogawa | |
| 5,425,436 A | 6/1995 | Teramura et al. | |
| 5,428,533 A | 6/1995 | Ogawa | |
| 5,450,322 A | 9/1995 | Tanaka et al. | |
| 5,513,108 A | 4/1996 | Kishimoto et al. | |
| 5,555,501 A | 9/1996 | Furihata et al. | |
| 5,558,398 A | 9/1996 | Santos | |
| 5,603,387 A | 2/1997 | Beard et al. | |
| 5,623,410 A | 4/1997 | Furihata et al. | |
| RE35,572 E | 7/1997 | Lloyd et al. | |
| 5,732,370 A * | 3/1998 | Boyle et al. | 701/37 |
| 5,735,509 A | 4/1998 | Gryp et al. | |
| 5,908,456 A * | 6/1999 | Wahlers | 701/37 |
| 5,941,920 A | 8/1999 | Schubert | |
| 5,975,508 A * | 11/1999 | Beard | 267/136 |
| 6,000,703 A | 12/1999 | Schubert et al. | |
| 6,029,764 A | 2/2000 | Schubert | |
| 6,067,491 A | 5/2000 | Takahashi | |
| 6,237,889 B1 | 5/2001 | Bischoff | |
| 6,264,163 B1 | 7/2001 | Ivarsson | |
| 6,314,353 B1 | 11/2001 | Ohsaku et al. | |
| 6,371,456 B1 | 4/2002 | Ritchie et al. | |
| 6,467,748 B1 * | 10/2002 | Schick et al. | 248/550 |
| 6,719,258 B2 | 4/2004 | Bryngelson et al. | |
| 6,886,650 B2 * | 5/2005 | Bremner | 180/89.13 |
| 7,887,033 B2 * | 2/2011 | Shoemaker et al. | 267/136 |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2004/0227050 A1 | 11/2004 | Haller | |
| 2007/0278025 A1 * | 12/2007 | Shoemaker et al. | 180/89.13 |
| 2008/0156602 A1 * | 7/2008 | Hiemenz et al. | 188/267.1 |
| 2009/0179390 A1 | 7/2009 | Wurmthaler et al. | |
| 2010/0044685 A1 | 2/2010 | Kim et al. | |

FOREIGN PATENT DOCUMENTS

| | | |
|---|---|---|
| DE | 6605170 | 1/1970 |
| DE | 2502627 | 7/1976 |
| DE | 19714576 | 10/1998 |
| DE | 20214583 | 1/2003 |
| DE | 102004013395 | 10/2005 |
| DE | 102004013308 | 12/2005 |
| DE | 102005048961 | 4/2007 |
| EP | 0089794 | 9/1983 |
| EP | 0739766 | 10/1996 |
| EP | 1352595 | 10/2003 |
| EP | 1464866 | 10/2004 |
| EP | 1468870 | 10/2004 |
| EP | 1577156 A2 * | 9/2005 |
| EP | 1188608 | 7/2006 |
| EP | 1987970 | 11/2008 |
| GB | 1521520 | 8/1978 |
| JP | 61075008 | 4/1986 |
| JP | 02133215 | 5/1990 |
| JP | 02197470 | 8/1990 |
| JP | 03200485 | 9/1991 |
| WO | 8703256 | 6/1987 |
| WO | 8912766 | 12/1989 |
| WO | 2006134417 | 12/2006 |

OTHER PUBLICATIONS

Kern et al., Vehicle seat for a commercial vehicle, Sep. 21, 2005, EPO, EP 1 577 156 A2, Machine Translation of Description.*

* cited by examiner

APPARATUS AND METHOD FOR ACTIVE SPRING SUSPENSION OF A VEHICLE COMPONENT

PRIORITY CLAIM

This application claims priority to German Application Serial Nos. 10 2007 058 652.5 filed Dec. 4, 2007; 10 2007 062 927.5 filed Dec. 21, 2007; and 10 2008 058 409.6 filed Nov. 21, 2008, contents of which are incorporated herein.

The present invention relates to a vehicle with a vehicle component moveable in an oscillating manner with respect to a first vehicle component, and a first measuring means for measuring at least one acceleration measuring value of the first vehicle component with respect to a ground surface, and to a method for active spring suspension of vehicle components within a vehicle.

In off-road vehicles, such as tractors and building machines, the vehicle seat and its movement often greatly influence the fatigue and, in the long run, even the health of the vehicle driver. To reduce the driver's stress, the seat has the task of minimizing the acceleration acting on the driver. Since significant vertical movement of the cabin can occur when driving off-road, care has to be taken that the end stops of the spring travels are not reached. In this context, various spring suspension principles are known which differ from one another in their complexity and energy requirement. There are therefore passive, semi-active and active spring suspension systems.

In passive spring suspension systems, as they are often used for vehicle seats, the properties of the spring components are predefined by their structural preconditions, and cannot be altered during spring operation. In semi-active spring suspension systems, dissipative properties of the seat spring can be selectively influenced depending on each situation. Either the hardness of a damper used between the driver's seat and a cabin floor can be adjusted, for example, and/or a stiffness of a spring element between the driver's seat and the cabin floor can be adapted. In active spring suspension systems, on the other hand, it is attempted to influence the spring suspension system in an active way by feeding energy into the spring suspension system.

Often the problem is encountered that an oscillating reaction of the driver's seat has to deal with both a ground surface oscillation excitation acting from below and a load reversal oscillation excitation caused by the driver. For example, the driver applies a different excitation to the driver's seat when he seeks contact with the foot pedal for operating the vehicle, while an oscillation excitation due to rough ground surface conditions acts from below. This means, that at least two different oscillation excitations acting on a driver's seat have to be taken into account for greater seating comfort to be ensured for a driver without, for example, the end stops of the spring travels of the driver's seat being reached. An active oscillation isolation required therefore should not only ensure maximum possible driver comfort with respect to the oscillating action and the acceleration values resulting therefrom for the driver's seat, but also the competing aim of a limited excursion of the driver's seat.

It is therefore the object of the present invention to provide a vehicle and method for active spring suspension of a vehicle comprising a first and a second vehicle component, which ensures a high level of comfort for a person using the vehicle in spite of oscillation excitations acting both on the first and the second vehicle component.

This object is solved by an apparatus according to the features of claim 1 and by a method according to the features of claim 6.

The core idea of the invention involves, in a vehicle comprising a second vehicle component moveable in an oscillating manner with respect to a first vehicle component, and a first measuring means for measuring at least one acceleration measuring value of the first vehicle component with respect to a ground surface, arranging a calculation means for determining an optimum acceleration value of the second vehicle component as a function of the measured acceleration measuring value, wherein at least one actuator is present between the first and second vehicle components, which is provided with a control and closed-loop control unit for minimizing a deviation of a real acceleration value of the second vehicle component from the optimum acceleration value while using an available spring path.

Also, a method for active spring suspension closed-loop control of the vehicle comprising the first and second vehicle component, and the measuring means, is provided, which determines the optimum acceleration value of the second vehicle component as a function of the measured acceleration measuring value of the first vehicle component by means of the calculation means, and minimizes the deviation of a real acceleration value of the second vehicle component from the optimum acceleration value using the available spring path, by means of the at least one actuator and the control and closed-loop control units associated therewith.

In the case of such an active spring suspension of a vehicle comprising at least a first and a second vehicle component and the associated method for active spring suspension, it is possible despite a spring oscillation of the first vehicle component, which is a vehicle cabin of a tractor, for example, to optimally spring suspend the second vehicle component, which may be a vehicle seat, for example, with respect to an oscillation comfortable for the driver, wherein the SEAT (Seat Effective Amplitude Transmissibility) value should be held as low as possible. The SEAT value is the quotient of an effective value of the acceleration value of the driver's seat and the effective value of the acceleration value of the cabin. Since the effect of oscillation acting on the human body is frequency-dependent, the acceleration values are weighted with an evaluation filter prior to forming the effective value. The acceleration acting on the driver, or the person using the seat, should be as low as possible to obtain a high degree of comfort for the driver or the person.

At the same time, there is a limited excursion $z_A = z_S - z_K$ of the vehicle seat with respect to the ground surface, wherein $z_S$ is the vertical absolute position of the seat and $z_K$ is the vertical absolute position of the cabin floor in an initiated oscillation. In the case of such a limited excursion, the operability of the vehicle must be ensured at the same time, for example, the foot of the driver must be able to be in continuous contact with the accelerator pedal. Simultaneously, contact with the end stops of the spring suspension apparatus, such as an air spring, together with a damper, should be avoided in the up and down movement of the driver's seat.

The spring suspension method according to the present invention and a vehicle with a corresponding spring suspension is characterized in that a spring suspension closed-loop control of an active driver's seat is provided, which is based on a model for generating an ideal trajectory for the behavior of the seat from the measured acceleration of the cabin floor. This ideal behavior is tracked by the actual seat behavior by means of pilot control and trajectory tracking closed-loop control. The vehicle seat is therefore controlled along a trajectory represented by an ideal model, wherein an optimum excursion value $z_{A\ setpoint}$ is predetermined. This enables a fast excursion or positional closed-loop control circuit, or a trajectory tracking closed-loop control.

According to a preferred embodiment, in the calculating means, the optimum excursion $z_{A\ setpoint}$ and the optimum velocity $\dot{z}_{A\ setpoint}$ of the second vehicle component, or the vehicle seat, with respect to the ground surface is determined from the optimum acceleration value $\ddot{z}_{setpoint}$ of the second vehicle component, and is fed to the actuator as a control force signal by means of the control unit.

Also, a real excursion $z_A$ of the optimum excursion $z_{A\ setpoint}$ of the second vehicle component is matched by means of a closed-loop control unit arranged between the calculating unit and the actuator, by output of a closed-loop control force signal to the actuator.

The sum of a closed-loop control force of the closed-loop control unit and a control force of the control unit results in a setpoint force to be applied by the actuator, which is to act on the actuator for adjusting the optimum excursion.

The first vehicle component can be a vehicle cabin floor, for example, and the second vehicle component can be the vehicle seat, or a vehicle seat component, for example, such as the top of a pantograph arm or two pantograph arms arranged between the vehicle seat and the vehicle cabin floor. Other vehicle components of a vehicle can also be used as the first and second vehicle components, such as in the area of the chassis.

The calculating means is for determining an ideal trajectory for the spring suspension and oscillating behavior of the second vehicle component to minimize its real acceleration value. The ideal model applied by the calculating means for calculating the optimum acceleration value, the optimum excursion and the optimum velocity as a function of the initiated oscillations, coming for example, from below from the ground surface and acting on a vehicle seat via the vehicle cabin, does not determine the force between the top of the seat and the seat by means of real springing or damping elements but freely as a function of condition parameters of the excursion or spring excursion $z_{A\ setpoint}$ and the excursion velocity or the spring excursion velocity $\dot{z}_{A\ setpoint}$ To be able to directly see the resulting seat acceleration, also a mass, including the person using the seat and, if necessary, also the seat's own weight, $m_0$ is normalized to 1.

Thus, in a simple mathematical model for the system comprising the vehicle seat, with the person or driver, not only a mass of the person and the seat cushion, but also the mechanical coupling in the pantograph of the seat by means of springing and damping elements, and the active force actuator is to be taken into account when modeling an ideal model. The seat acceleration $\ddot{z}_S$ associated with the measured cabin acceleration $\ddot{z}_K$, which is due to a spring oscillation initiation resulting from a rough ground surface is to be determined in such a way that the quality criteria of a seat spring suspension are optimally fulfilled. If the development of the optimum seat acceleration $\ddot{z}_{S\ setpoint}$ and therefore also the optimum excursion $z_{A\ setpoint}$, and its derivative $\dot{z}_{A\ setpoint}$ is known, in the knowledge of the behavior of the passive elements of the seat, such as the pantograph with the force $$F_{pantograph} = f(\dot{z}_A, z_A)$$

the force to be applied by the active actuator $$F_{control} = m\ddot{z}_{setpoint} + f(\ddot{z}_{Ssetpoint}, z_{Asetpoint})$$

can be determined. Apart from this control, a tracking setpoint closed-loop control is necessary due to modeling insecurities and for compensating the forces $F_{driver}$, applied by the driver, for example, for actuating pedals, which tracks the real seat excursion $z_A$ and its setpoint value $z_{A\ setpoint}$ by means of a further force component $F_{closed-loop\_control}$. The result is a setpoint force of the actuator $$F_{setpoint} = F_{control} + F_{closed-loop\_control}$$

An essential advantage of an active closed-loop control concept becomes visible in that the seat excursion is always adjusted by closed-loop control tracking the setpoint position associated with the ideal acceleration, which means that the tracking closed-loop control can be made very fast and therefore the deviating movement during pedal actuation can be held very small. The driver thus has the feeling of very positively defined seat support, without this leading to poorer oscillation isolation and therefore greater SEAT values.

In the method according to the present invention, the calculating means determines an ideal trajectory for the spring oscillating behavior of the second vehicle component for minimizing a real acceleration value. In the calculating means, from the optimum acceleration value $\ddot{z}_{S\ setpoint}$ of the second vehicle component, an optimum excursion $z_{A\ setpoint}$ and the optimum velocity $\dot{z}_{A\ setpoint}$ of the second vehicle component with respect to the first vehicle component is determined and fed to the actuator as a control force signal by means of the control unit. Also, by means of the closed-loop control unit, a real excursion $z_A$ of the optimum excursion $z_{A\ setpoint}$ of the second vehicle component is matched to the actuator by outputting a closed-loop control force signal.

According to a preferred embodiment, an excursion of the second vehicle component is controlled to a setpoint value associated with the optimum acceleration value.

Further advantageous embodiments are defined in the subclaims.

Advantages and practical considerations can be seen from the following description with reference to the drawings, wherein.

Figure 1:
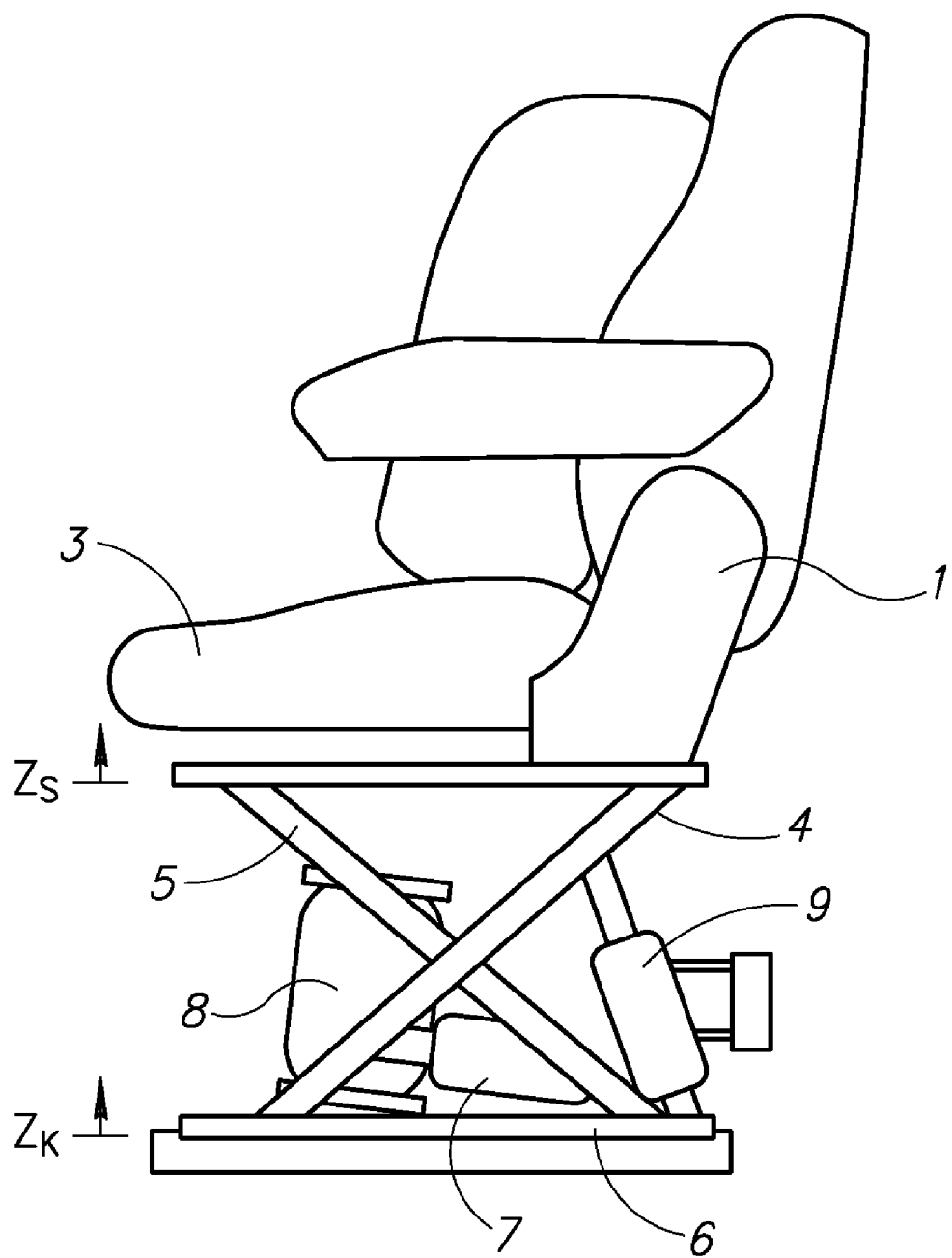
FIG. 1 is a schematic illustration of the vehicle seat with indicated parameters for illustrating the present invention.

First the structure of the sprung seat to be closed-loop controlled is considered. With reference to FIG. 1, in a schematic illustration, a basic structure of such a vehicle seat is shown, such as it can be provided according to the present invention. Vehicle seat 1 consists of a cushion 3, a dummy arranged thereon, which is to represent the driver, and undercarriage 6 and a pantograph 4, 5 arranged between the undercarriage and the top of the seat. Additionally, a damper 7, an air spring 8 and, according to the present invention, an actuator 9 are arranged between the pantograph arms and the undercarriage or the top portion and the undercarriage.

Variable z represents the vertical space coordinate, subscript S represents the pantograph top arm, or the vehicle seat, K represents the cabin floor and A the spring suspension, which gives:

$$z_A = z_S - z_K.$$

Figure 2:
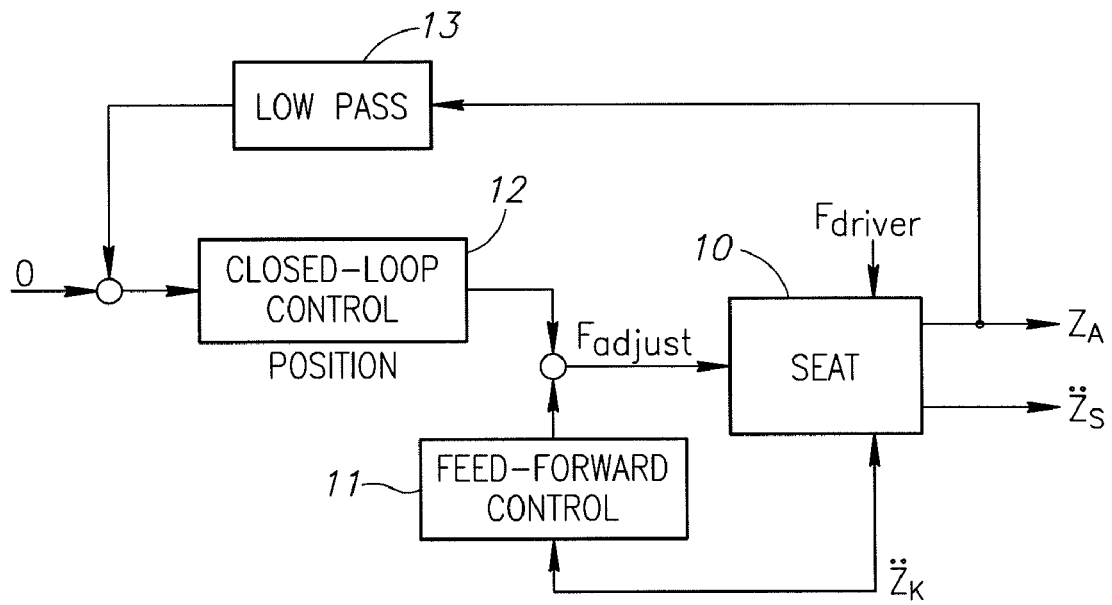
FIG. 2 is a schematic diagram for a closed-loop control method for actively spring-suspended seats with feed-forward control.

The basis for the new closed-loop control method is a closed-loop control concept for actively spring-suspended seats, comprising a feed-forward control, which corresponds to a control, and a positional closed-loop control, as it is shown in FIG. 2.

Dimensioning of an oscillation isolation of an active seat system for a seat 10 is carried out with the help of a feed-forward control 11. It is generally dimensioned in such a way that middle and high frequency oscillation excitations do not affect seat acceleration $\ddot{z}_S$. Cabin movements of low frequency must be transferred to the seat, however, since otherwise the spring path needed would be too great. To hold the seat in its middle position despite additional forces $F_{driver}$, which result, for example, from the actuation of pedals, a position closed-loop control having the middle position as its setpoint value is also needed. This is indicated with reference numeral 12 and reference numeral 13. A basic drawback of such a well-known closed-loop control concept is, however, that this position closed-loop control cycle must be carried out relatively slowly so as not to degrade the oscillation isolation achieved by the control. This circumstance is indicated by the low pass included in the position measuring channel.

Figure 3:
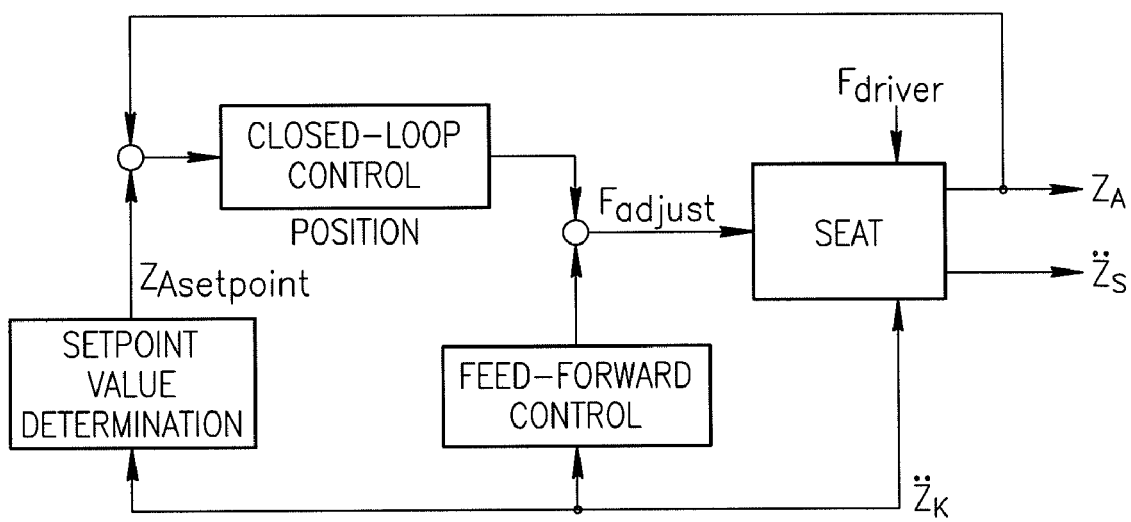
FIG. 3 is a schematic diagram for a closed-loop control method with desirable oscillation isolation.

As a setpoint value of the seat position, it would be advantageous to use not the middle position but the spring excursion resulting from the desired oscillation isolation. Such a closed-loop control system or concept as shown in FIG. 3 will be described in more detail in the following, where the setpoint value determination and feed-forward control are not, as shown, independent of one another, but are conceived on a common basis.

Figure 4:
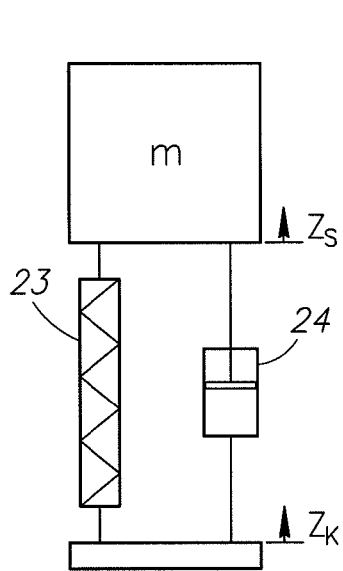
FIG. 4 is a schematic illustration of a physical model of a real seat.
Figure 5:
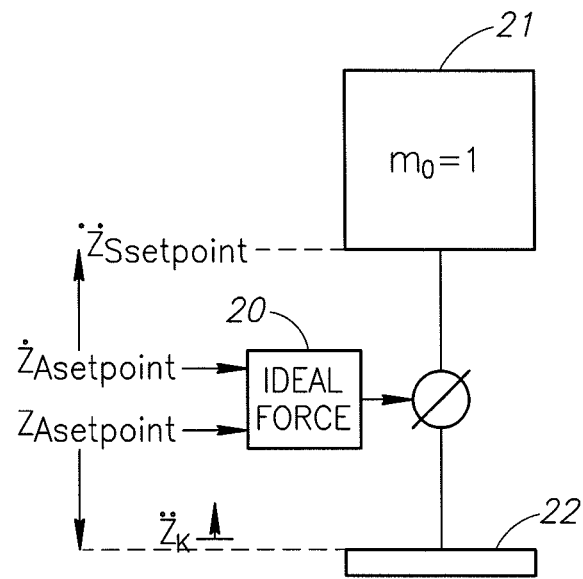
FIG. 5 is a schematic illustration of a physical model of an ideal seat.

To be able to find the development of the excursion or spring excursion setpoint value, a model of an ideal seat is used as is schematically shown in FIG. 5. It is based on the physical model of a real seat, as schematically shown in FIG. 4. In the ideal model according to FIG. 5, however, force 20 between a seat top 21 and the component of a cabin 22 is not created by real spring and damper elements 23, 24, but freely as a function of the state variables of the spring excursion $z_{A\ setpoint}$ and the spring excursion velocity $\dot{z}_{A\ setpoint}$. To be able to directly see the resulting seat acceleration, mass $m_0$ is moreover normalized to 1.

As a function $f_{opt}$ for calculating the predeterminable ideal force or seat acceleration $\ddot{z}_{S\ setpoint}$ first, a polydimensional polynomial is formulated:

$$\ddot{z}_{Ssetpoint} = f_{opt}(z_{Asetpoint}, \dot{z}_{Ssetpoint}) = \sum_{j=1}^{N} \sum_{i=0}^{j} k_{i,j} z_{Asetpoint}^{i} \dot{z}_{Ssetpoint}^{(j-i)} \quad (1)$$

Subsequent numerical optimization leads to the coefficient $k_{i,j}$ of this polynomial. The number of coefficients to be determined can be substantially reduced if it is stipulated that the seat must react in mirror image to excitation in the positive and negative direction. Then the following applies for the coefficients $$k_{i,j} = 0, j \in \{2,4,6,\ldots\} \quad (2)$$

From such an optimization, an SEAT value of the ideal model which is as small as possible should result in a typical excitation. To avoid end stops of the air spring during the excursion motion, it is demanded as an additional condition of optimization that a maximum spring path, such as 95 mm, must not be exceeded even with the most extreme excitation to be expected.

Figure 6:
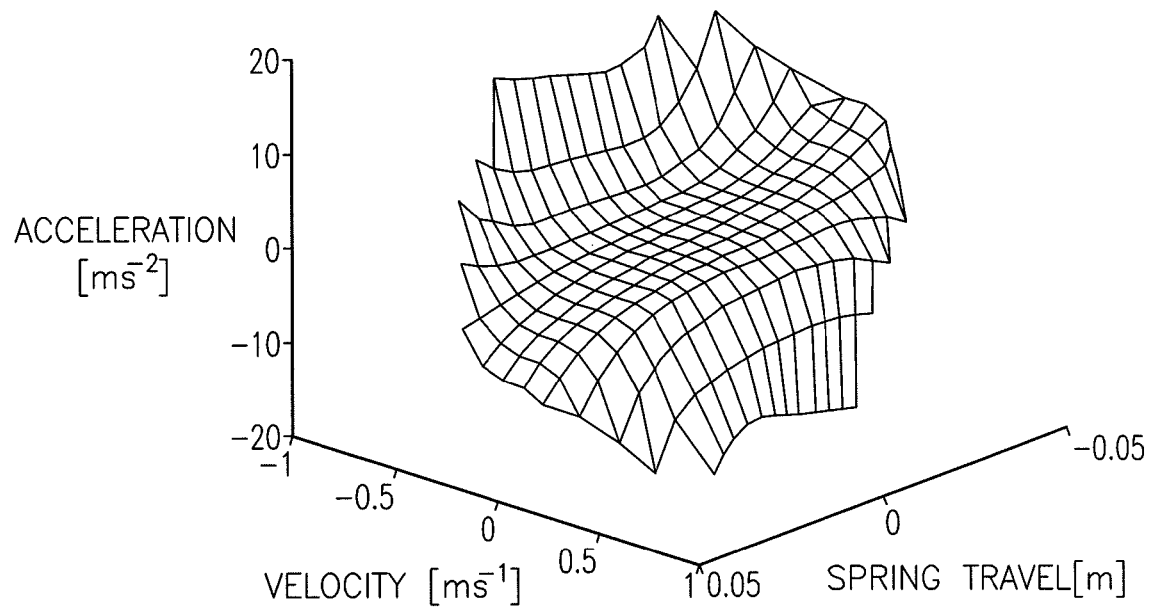
FIG. 6 is a graph of a characteristic field of oscillating behavior with acceleration, velocity and spring path values.

For the excitation, both a typical case and an extreme case of a cabin movement are considered, whose spectral power density corresponds to $(1.8)^2$ times the normalized signal EM3 from ISO 7096 and has a maximum positional change of 170 mm within one second. FIG. 6 shows the characteristic field of the resulting optimized non-linear function, wherein the ordinate is the acceleration and the x and y abscissae are the velocity and the spring path.

According to the characteristic field of the optimized seat acceleration according to FIG. 6 it can be seen that only very small accelerations are transferred to the driver with small excursions and low relative velocities. Only with high relative velocities, in particular near the end stops of the spring elements and with movements in the direction of these end stops, great acceleration values act on the driver. Thus the result is an amplitude-selective seat behavior. This can also be seen from table 1, as follows:

TABLE 1

| | Excitation signal EM3 | | | |
|---|---|---|---|---|
| Amplitude scaling | 100% | 130% | 150% | 180% |
| SEAT value | 0.31 | 0.36 | 0.40 | 0.47 |
| Spring path [mm] | 82 | 89 | 92 | 95 |

From table 1 SEAT values resulting from different excitation signals in the ideal model can be seen with associated spring travels. Thus simulation results of the ideal seat are shown during normalized excitation EM3.

If the real seat of FIG. 4 had the above shown behavior with a given mass, the real seat would behave in an ideal manner with respect to oscillation isolation. Then a feed-forward control could be omitted, as it is shown in FIG. 3, and the closed-loop control would only have to equalize the influence of the driver forces via the actuator. It is, however, nearly impossible, to realize the behavior shown for drivers of every weight. Even if a purely passive realization of these seat characteristics was possible, it should not be implemented without additional positional closed-loop control, since the spring is very soft about the rest position, and the seat would not give the driver a positively defined seat feeling. When realizing an active seat without passive elements, there are demanding requirements on a maximum force $F_{max} = m_{max} \ddot{z}_{Ssetpoint\_max}$ of the actuator. A reduction of the required actuator force can be achieved by the best approximation between mass weighted ideal acceleration and spring-, damper force of the real seat, as can be seen from the subsequently derived equation (8).

For the desired ideal model, not only a mass of the driver, or the person using the seat, and the seat cushion, but also the mechanical coupling in the pantograph structure of the seat by means of the spring and damper element and the active force actuator are taken into consideration when establishing the ideal model. This will be considered in more detail below. Thus, for a measured cabin acceleration $\ddot{z}_K$, the seat acceleration $\ddot{z}_S$ is to be determined in such a way that the quality criteria, such as not reaching the end stops of the spring elements, are optimally fulfilled. This is achieved by the ideal model.

Since, as explained, for realizing an ideal seat, an active actuator is always needed, the limitation stating that the ideal force must only depend on relative parameters, can be omitted. An extension to include the influence of the cabin acceleration $$\ddot{z}_{Ssetpoint} = \bar{f}(z_{Asetpoint}, \dot{z}_{Asetpoint}, \ddot{z}_K) \quad (3)$$

is obvious, since the optimum seat movement is surely also associated with the excitation. For optimizing purposes the function $\bar{f}_{opt}$ is split into two parts, one portion $\bar{f}_{optR}$ for reducing the relative parameters, and one portion $\bar{f}_{optA}$ for feedforward controlling the excitation as a function of the relative parameters and the excitation direction:

$$\bar{f}_{opt}(z_{Asetpoint}, \dot{z}_{Asetpoint}, \ddot{z}_K) = \bar{f}_{optR}(z_{Asetpoint}, \dot{z}_{Asetpoint}) + \bar{f}_{optA}(z_{Asetpoint}, \dot{z}_{Asetpoint}, \text{sign}(\ddot{z}_k))\ddot{z}_K. \quad (4)$$

The functions $\bar{f}_{optR}$ and $\bar{f}_{optA}$ are also formulated as polydimensional polynomials and their coefficients are numerically optimized as described.

Apart from the already mentioned optimizing objective, namely the reduction of the SEAT value while keeping within the available spring path, further desirable characteristics can also be considered in the form of a quality vector optimization.

The driver may find it disconcerting, for example, if in typical operation of the occupied seat, great relative excursions happen frequently. Since no objective quality criterion is known herefore, the middle value of the excursion is calculated from the spring excursion development when excited with the normalized signal, and is used as a quality criterion.

It is also important, that the seat returns to its rest position from a deflected state $z_{A0}$ within a reasonable time after finishing the excitation. As a quality criterion, the time-weighted squared control surface is used to ensure returning to the rest position.

The ideal model optimized with the inclusion of the above additional conditions and while using the same excitation signals, is superior in these essential aspects to the simple model of an optimum seat. This can be seen from the SEAT values and spring travels of the extended and the simple ideal model shown in table 2. This is why only the extended ideal model will be considered in the following and referred to as the ideal model in short.

TABLE 2

| | Excitation signal EM3 Ideal model | | | | | | | |
|---|---|---|---|---|---|---|---|---|
| | Extended | | | | Simple | | | |
| | Amplitude scaling | | | | | | | |
| | 100% | 130% | 150% | 180% | 100% | 130% | 150% | 180% |
| SEAT value | 0.28 | 0.30 | 0.32 | 0.37 | 0.31 | 0.36 | 0.40 | 0.47 |
| Spring path [mm] | 83 | 88 | 90 | 95 | 82 | 89 | 92 | 95 |

Table 2 shows simulation results of the simple and extended ideal models as described above.

Due to the fact that the optimization is carried out using concrete excitation signals, the thus determined optimum function $\bar{f}_{opt}$ only minimizes the quality functional for a certain excitation signal. If the excitation spectrum of a vehicle deviates from the signal used for its conception, the ideal model is no longer optimal. It can therefore be useful to develop an adapted ideal model for each vehicle class and excitation type.

The potential for improvement which is facilitated by these adapted ideal models, is to be considered in more detail. For this purpose, from a plurality of well known normalized excitation signals, two further signals are selected, which are as different from each other as possible and as different as possible from the already used scaled EM3 signal with respect to the acceleration spectrum and maximum excitation travel $z_{Kmax}$. The power density spectra of acceleration of these normalized signals are shown in FIG. 7 wherein, in the graph, the ordinate represents the PSD values and the abscissa the frequency values.

Figure 7:
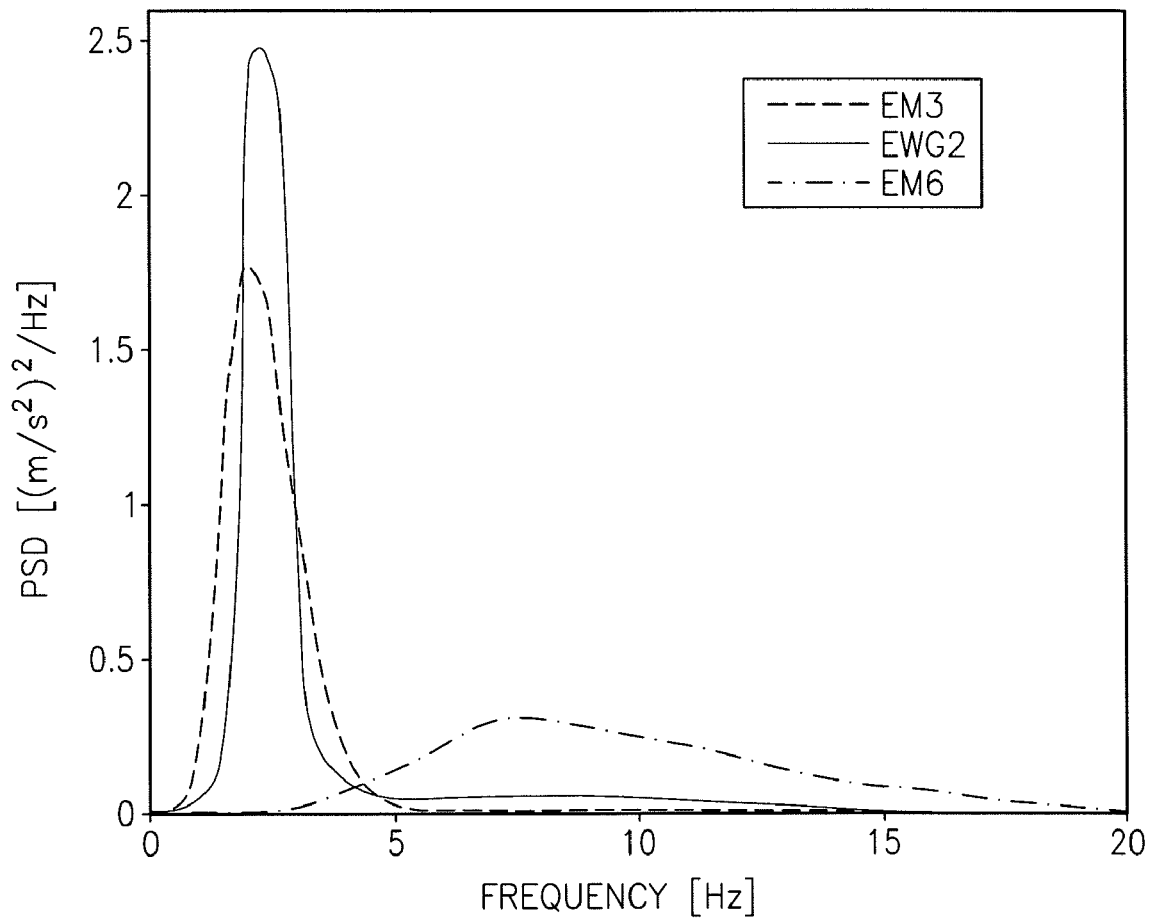
FIG. 7 is a graph with PSD values and frequency values of the acceleration of normalized signals.

It can be seen from the graph according to FIG. 7 that, when the normalized signal is used, EM3 has relatively low frequency components, or when scaled to 180%, has great excitation travels, namely $z_{Kmax}$=182 mm, for example, while the signal EM6 has only very short travels, namely $z_{Kmax}$=12 mm at high frequencies. The excitation signal EWG2 for tractors of category A, class 11, with a smaller excitation travel, namely $z_{Kmax}$=90 mm, has a spectrum of a substantially narrower band when compared to the EM3 signal. Each of the two additional normalized signals is used as a typical excitation for devising a further ideal model. In the optimization, the extreme excitation EM3 of 180% is further used for testing end stop prevention.

Figure 8:
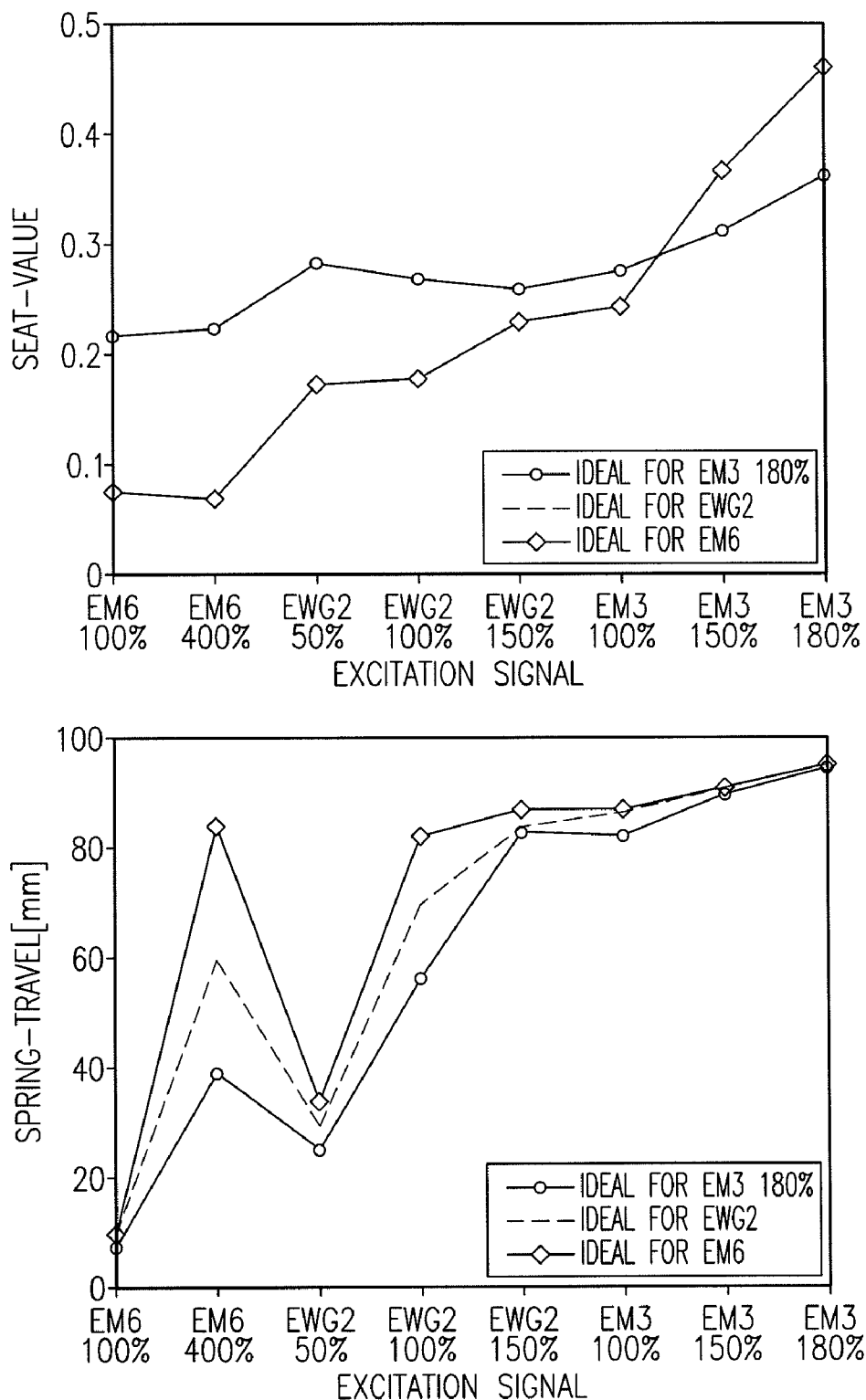
FIG. 8 is a graph of SEAT values or spring travels as a function of excitation signals of the oscillation developments.

In order to compare the potential of the different ideal models, each SEAT value and the associated spring path when excited with the selected normalized signals is determined in different scalings. The results for this can be seen from FIG. 8. In FIG. 8, the SEAT values or the spring travels are the ordinate, and the different excitation signals are the abscissa. When comparing the development lines of different excitation signals shown in FIG. 8, it can be seen that the ideal model based on excitation signal EM6 results in comparatively good SEAT values even when excited with the other test signals of small amplitudes, namely EM6 400% and EWG2 50%, albeit with an increased spring path requirement. When the travel excitation is strong, its isolating effect is reduced. The ideal model optimized to EWG2 has the best isolating effect with test signals of middle-of-the-range excitation travels and with middle-of-the-range spring path requirements. However, even its isolating performance is reduced at powerful excitation. The ideal model based on the highest possible excitation, has the smallest spring path requirement over all excitation signals, but only has the best SEAT value at the strongest excitations.

The fixed choice of an ideal model adapted to the vehicle can thus improve oscillation isolation, wherein the isolation values achieved even with the non-adapted ideal models surpass those of available standard seats. For further improvement, an automatic selection of the suitable ideal model depending on the excitation resulting from the loading state and the ground surface would also be conceivable.

Now that the acceleration values have been measured on the cabin floor and an ideal movement of the driver's seat has been determined or calculated by means of predetermined parameters, such as the mass of the driver and the dimension of the spring path, an active actuator must then be driven to minimize the driver's seat acceleration, without reaching the end stops of the spring travels, which can exert a force in the retracting and extending directions.

To achieve this, both a control unit and a closed-loop control unit are necessary to control the spring suspension of the vehicle seat by means of the actuator in such a manner that when the seat moves differently to the ideal model an acceleration acting on the driver is minimized by means of the actuator while remaining within the available spring travels.

On the basis of the seat structure shown in FIG. 1, a calculation model of the active driver seat to be closed-loop controlled can be derived. Modeling takes into consideration not only a mass m with reference numeral 30 according to FIG. 9, which shows a schematic illustration of the calculation conditions of the seat model, for the driver and the seat cushion, but also mechanical coupling $F_{pantograph}$ with reference numeral 31 in the pantograph structure of the seat via spring and damper elements 32 not used as an actuator, as well as parasitic friction. The force equation for the acceleration of the real seat is therefore:

$$m\ddot{z}_S = F_{adjust} + F_{pantograph} + F_{driver} \quad (5)$$

Figure 9:
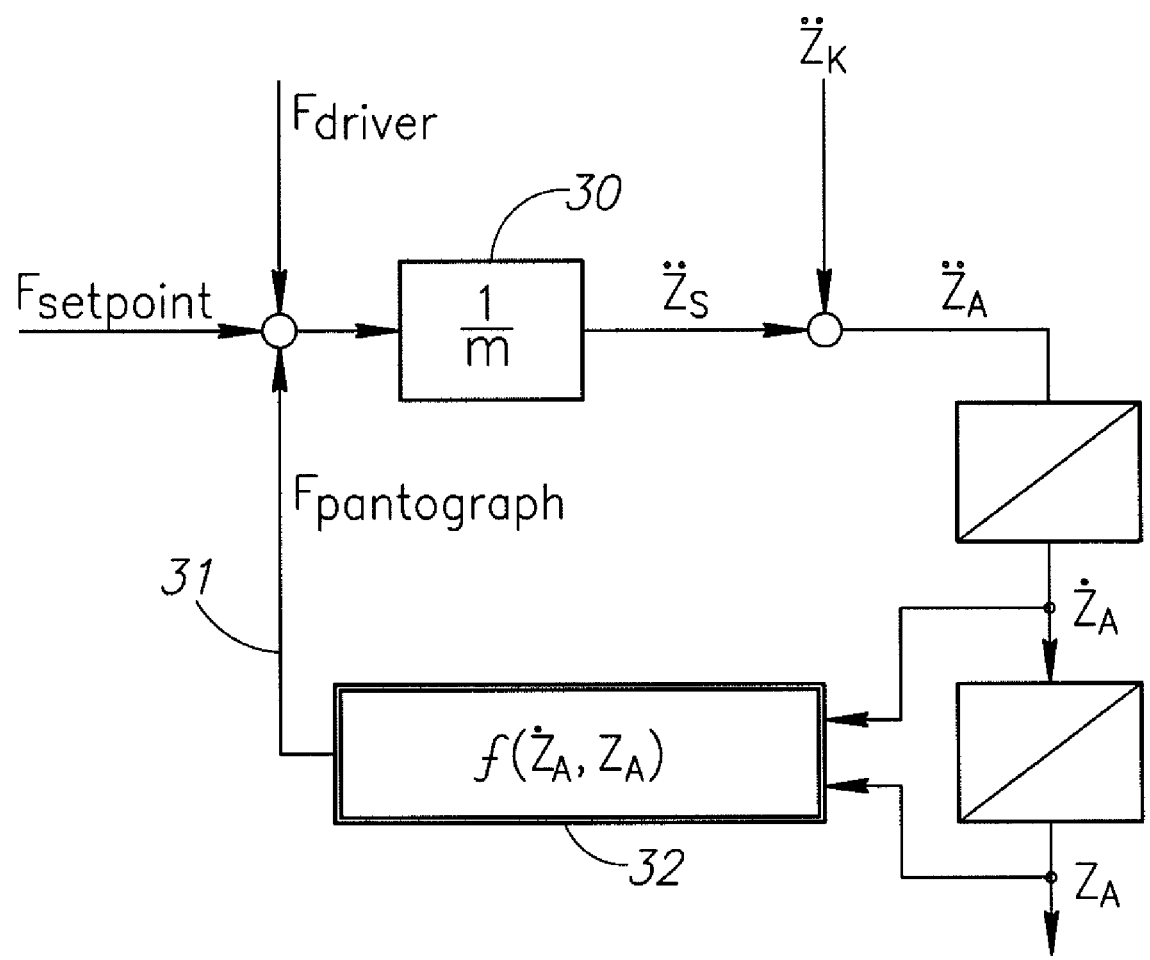
FIG. 9 is a schematic illustration of the calculation contexts of the seat model.

The interdependencies of this calculation are shown in a structural diagram according to FIG. 9.

As mentioned above, the control has the task to ensure good oscillation isolation. The development of the optimum seat acceleration $\ddot{z}_{S\ setpoint}$ as well as the optimum excursion $z_{A\ setpoint}$ and its derivative $\dot{z}_{A\ setpoint}$ are already known from the ideal model shown above. With knowledge of the behavior of the passive elements of the seat, the force $F_{pantographsetpoint} = f(\dot{z}_{Asetpoint}, z_{Asetpoint})$ generated by the pantograph in the optimum movement can be determined. With the adjusting signal $$F_{adjust} = F_{control} = m\ddot{z}_{Ssetpoint} - f(\dot{z}_{Asetpoint}, z_{Asetpoint}) \quad (6)$$

the actual seat acceleration can be determined with the help of equation (5) according to $$m\ddot{z}_S = m\ddot{z}_{Ssetpoint} - f(\dot{z}_{Asetpoint}, z_{Asetpoint}) + f(\dot{z}_A, z_A) + F_{driver}. \quad (7)$$

If the driver does not exert a force and if the initial state of model and seat coincide, the real seat will move like the ideal model it is based upon if the model is sufficiently precise.

With the simple ideal model according to equation (1), the control results in:

$$F_{adjust} = F_{control} = mf_{opt}(\dot{z}_{Asetpoint}, z_{Asetpoint}) + f(\dot{z}_A, z_A). \quad (8)$$

Here it can be seen that the control becomes superfluous if the pantograph characteristic is the same as that of the optimum seat.

Figure 10:
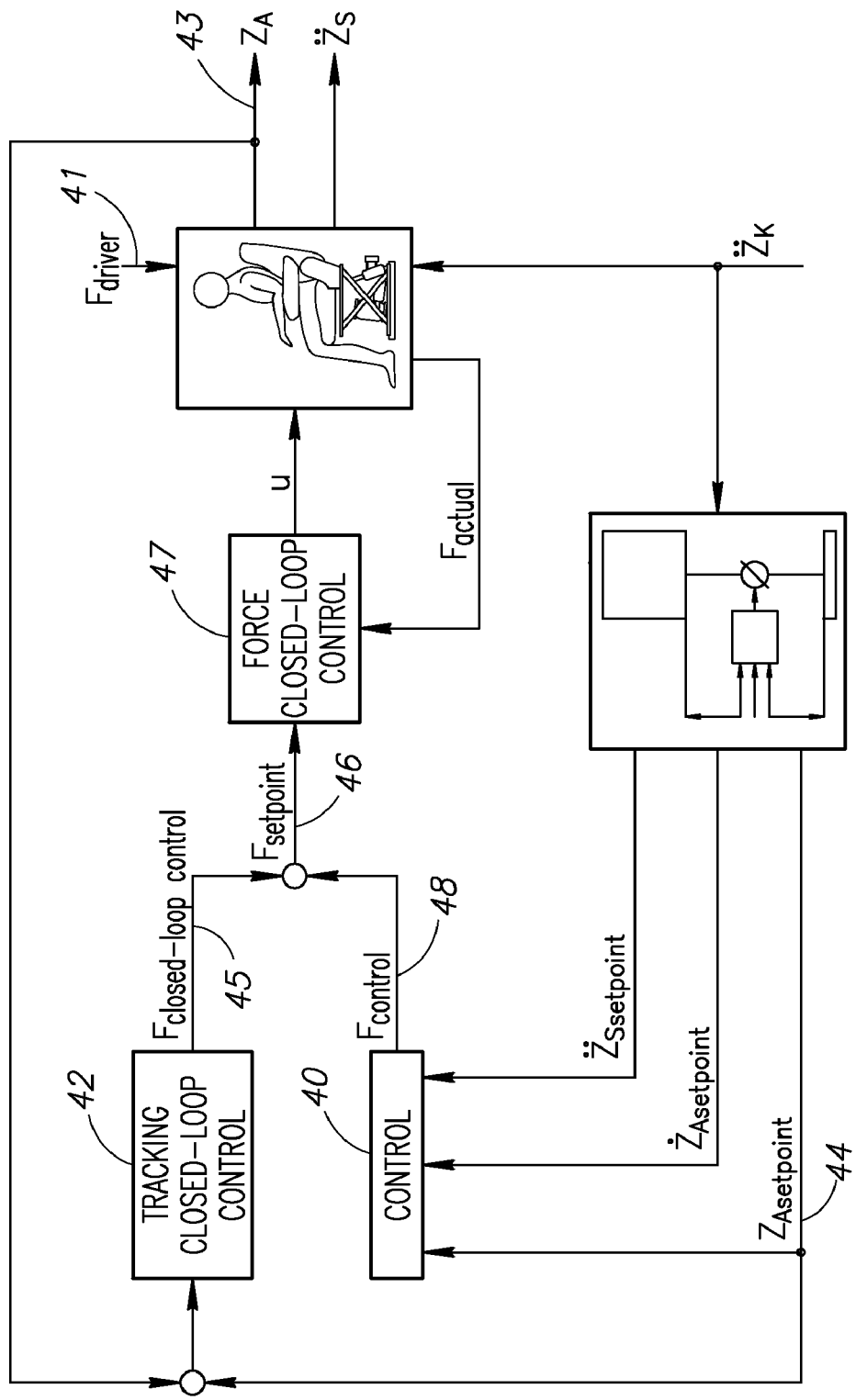
FIG. 10 is a schematic illustration of the overall structure of the spring-suspended vehicle seat according to the present invention.

Apart from control by means of a control unit 40, as shown in FIG. 10, in a schematic illustration of the overall structure of the spring-suspended vehicle seat according to the present invention, a tracking closed-loop control by means of a closed-loop control unit 42 is necessary due to modeling insecurity and for compensating the forces $F_{driver}$ with reference numeral 41 exerted by the driver, for example, when actuating the pedal, for tracking the real seat excursion $z_A$ with reference numeral 43 according to its setpoint value $z_{A\ setpoint}$ with reference numeral 44 by a further force component $F_{feedback\_control}$ with reference numeral 45. For setpoint force 46 of actuator 47, we therefore get $$F_{setpoint} = F_{control} + F_{closed-loop\_control} \quad (9)$$

This thus also includes the force of the control $F_{control}$ indicated by reference numeral 48.

An essential advantage of the present active closed-loop control concept according to the present invention is again illustrated in FIG. 10, since the seat excursion is always readjusted to the setpoint position associated with the ideal acceleration, the tracking closed-loop control cycle can be made very fast and therefore the evasive movement can be kept very small, for example when the pedal is actuated. The driver therefore has a feeling of being seated in a very positively defined manner without this leading to poorer oscillating isolation and therefore SEAT values. Since the essential, non-linear elements of the seat are considered, and in the ideal case are compensated in the control, a simple linearized replacement model of the seat can be used with reference to FIG. 9 for devising a tracking closed-loop control according to closed-loop control unit 42:

$$G_{distance}(s) = \frac{Z_{Amodel}(s)}{F_{setpoint}(s)} = \frac{1}{(ms^2 + ds + c)} \frac{Z_{actuator}(s)}{N_{actuator}(s)} = \frac{Z(s)}{N(s)}. \quad (10)$$

Figure 11:
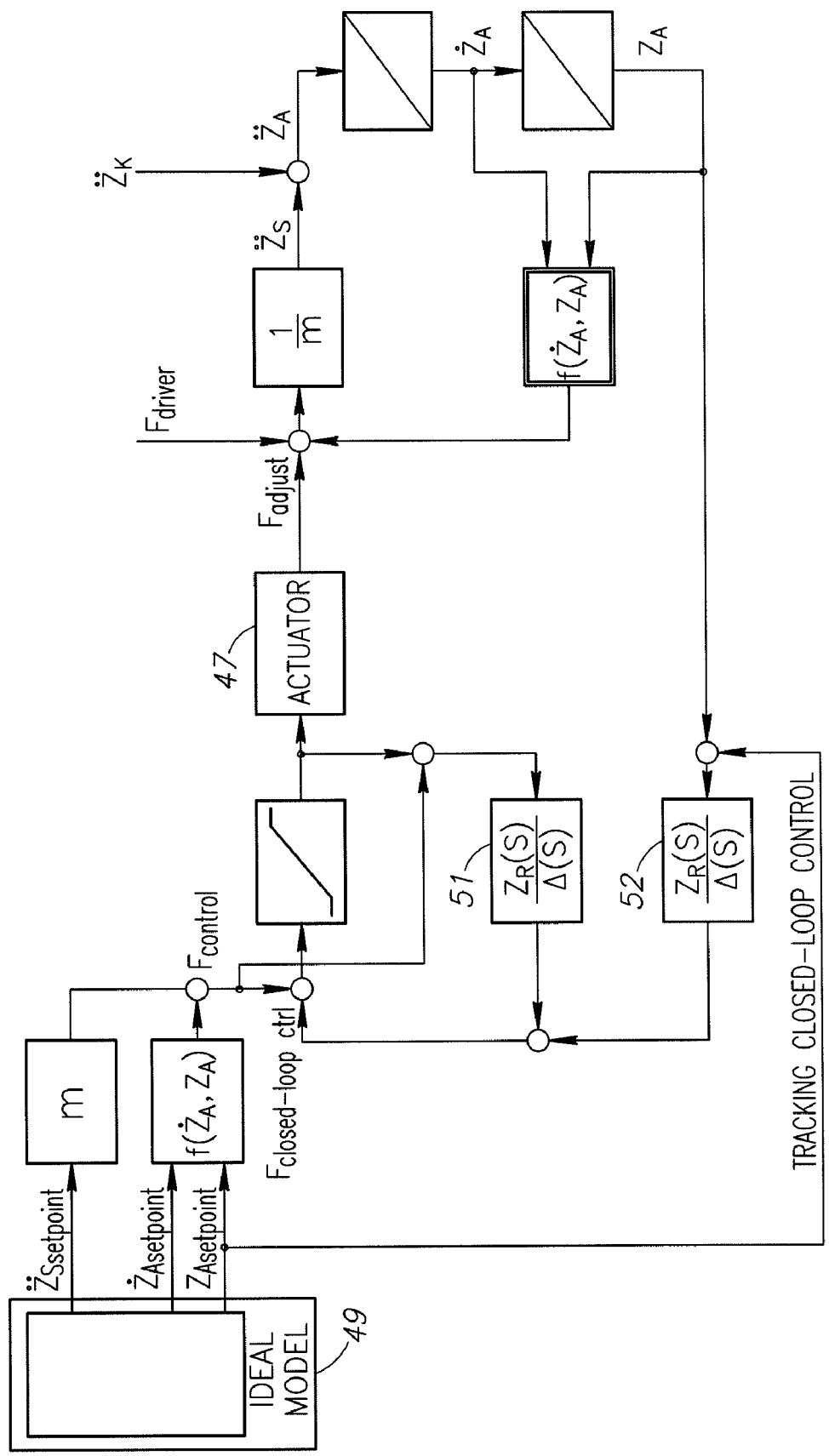
FIG. 11 is a schematic illustration of the structure of a state closed-loop control.

As a closed-loop control unit 42, a reference-based state closed-loop control with an integrated component devised in the frequency domain is used, whose structure is schematically shown in FIG. 11.

For designing closed-loop control unit 42, the design equation $$Z(s)Z_R(s) + N(s)Z_U(s) = (\tilde{N}(s) - N(s))\Delta(s) \quad (11)$$

must be solved for the closed-loop controller polynomials $Z_R(s)$ and $Z_U(s)$ to be determined, wherein $\Delta(s)$ is the characteristic polynomial of the viewer (reference) and $\tilde{N}(s)$ is the characteristic polynomial of the closed-loop-controlled distance and can be freely predetermined, when the degree of $\tilde{N}(s)$ and $\Delta(s)$ is equal to the degree of $N(s)$. The chosen closed-loop controller/viewer structure avoids closed-loop controller wind-up when reaching the adjustment limit, if the limiter 51, 52 contained therein imitates the adjustment limitation of actuator 47.

Figure 12:
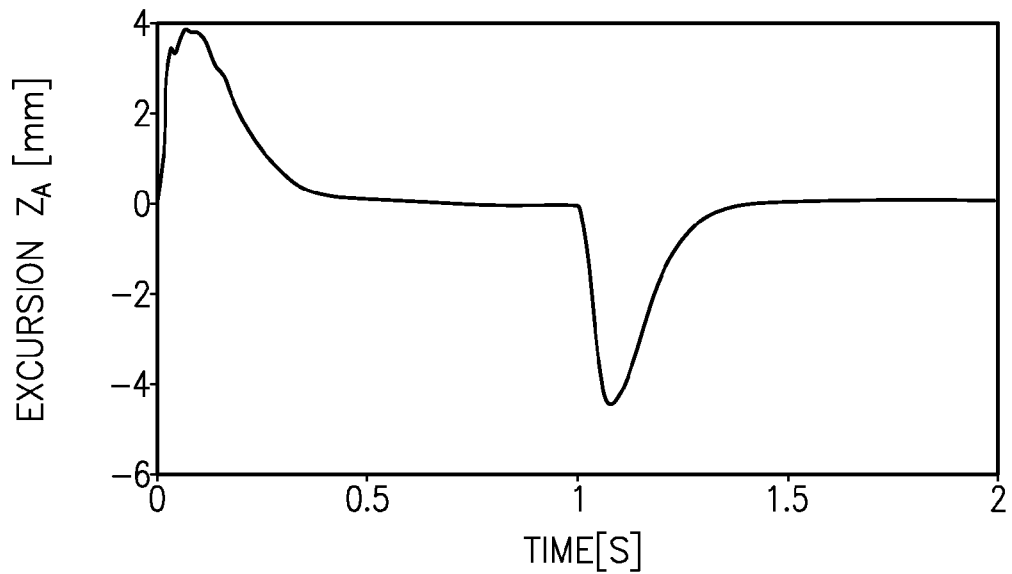
FIG. 12 is a graph of the reaction development of the seat in response to the driver suddenly getting up as a function of the excursion and the time.

As already mentioned, such a spring suspension method according to the present invention, apart from good oscillation isolation, also facilitates excellent suppression of disturbance forces. To illustrate this, FIG. 12 shows in a graph, in which the excursion is the ordinate and the time is the abscissa, the reaction of the seat to the driver suddenly getting up, at the beginning, and suddenly sitting down after a second. With the selected parameters of the closed-loop control, the maximum excursion of the seat when the driver is getting up is 4 mm and when he is sitting down is 4.5 mm. The closed-loop-controlled active seat therefore springs by less than 10% of its available spring path even with a maximum disturbance excitation, while a passive seat would extend to the top end stop of the spring elements.

Figure 13:
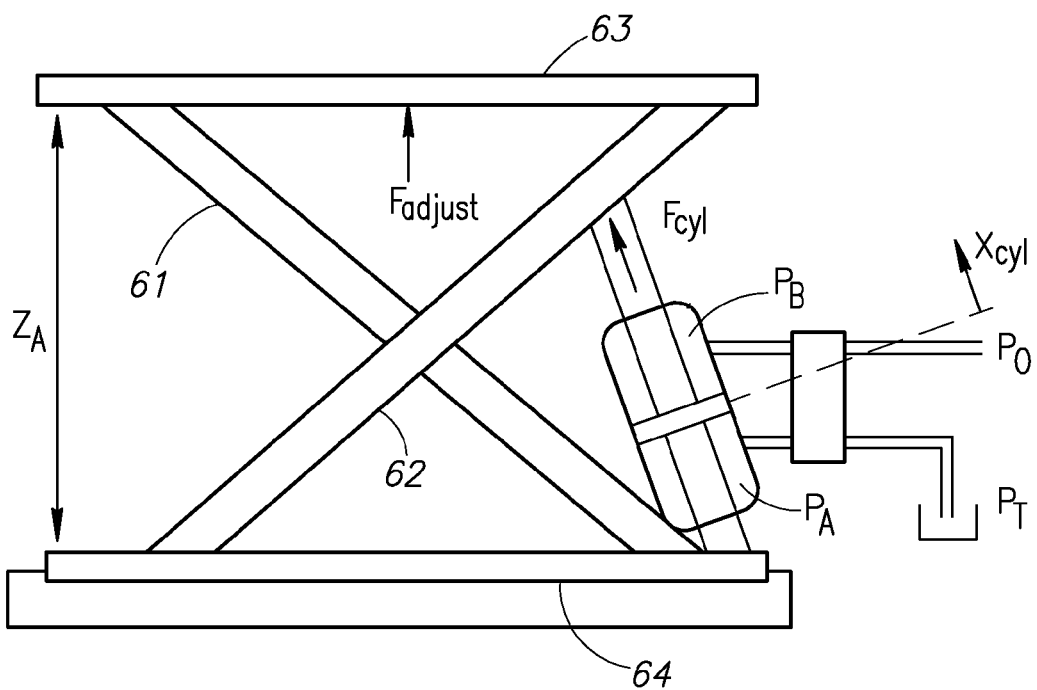
FIG. 13 is a schematic illustration of the assembled position of a hydraulic cylinder as an actuator.

For experimental investigations, a hydraulic cylinder is used as an actuator 60 according to FIG. 13. It is arranged in the pantograph structure 61, 62, which is arranged, in turn, between seat top 63 and seat bottom structure or cabin element 64. The assembled position of the hydraulic cylinder and the designation of the parameters used are schematically shown in FIG. 13.

A model of the synchronous cylinder used is first established. For the chamber pressures $p_A$ and $p_B$, we get $$\frac{dp_A}{dt} = \frac{E_{oil}}{V_A}\left(-\left(K_L(p_A - p_B) + A\dot{x}_{cyl}\right) + Q_A\right) \quad (12)$$

and $$\frac{dp_B}{dz} = \frac{E_{oil}}{V_B}\left(K_L(p_A - p_B) + A\dot{x}_{cyl} + Q_B\right) \quad (13)$$

wherein A is the effective piston surface, $E_{oil}$ is the elasticity module of the hydraulic oil used, $K_L$ is the oil leakage coefficient of the cylinder, $V_{A/B}$ flow in each of the cylinder chambers and can be adjusted by a 4-way/3-position directional valve. Under the precondition that the two chamber pressures are smaller than the supply pressure $P_0$ and greater than the tank pressure $P_T$, the valve volume flow rates as a function of valve opening $x_V$ can be described by equations $$Q_A = B_v x_v \sqrt{\frac{1}{2}(P_0 - P_T) + \text{sign}(x_v)\left(\frac{1}{2}(P_0 + P_T) - p_A\right)} \quad (14)$$

and $$Q_B = -B_v x_v \sqrt{\frac{1}{2}(P_0 - P_T) - \text{sign}(x_v)\left(\frac{1}{2}(P_0 + P_T) - p_B\right)}. \quad (15)$$

From equations (8) and (9), for the differential expression $p_\Delta = (p_A - p_B)$, $$\frac{dp_\Delta}{dt} = E_{oil}\left(-\left(\frac{1}{V_A} + \frac{1}{V_B}\right)(K_{L p_\Delta} + A\dot{x}_{cyl}) + \frac{Q_A}{V_A} - \frac{Q_B}{V_B}\right) \quad (16)$$

can be derived. By substituting equations (10) and (11) into equation (12), we get a new equation which can be resolved under the condition $$\frac{dp_\Delta}{dt} \overset{!}{=} \bar{u} \quad (17)$$

for the valve opening. If the adjustment law thus derived is used, we get $$x_v = \begin{cases} \dfrac{E_{oil}(V_A + V_B)\left(\begin{matrix}K_L p_\Delta + \\ A\dot{x}_{cyl}\end{matrix}\right) + V_A V_B \bar{u}}{E_{oil} B_V\left(V_A\sqrt{p_B - P_T} + V_B\sqrt{P_0 - p_A}\right)} & \text{for numerator} > 0 \\[2ex] \dfrac{E_{oil}(V_A + V_B)\left(\begin{matrix}K_L p_\Delta + \\ A\dot{x}_{cyl}\end{matrix}\right) + V_A V_B \bar{u}}{E_{oil} B_V\left(V_A\sqrt{P_0 - p_B} + V_B\sqrt{p_A - P_T}\right)} & \text{for numerator} < 0 \end{cases} \quad (18)$$

then the differential pressure of the cylinder with respect to the new input parameter $\bar{u}$ is linear and uncoupled from the cylinder movement.

What is actually interesting for the application in the seat is, however, the force $$F_{cyl} = A p_\Delta - m_{piston} f_K(x_{cyl}, \dot{x}_{cyl}, \ddot{x}_{cyl}, \dddot{x}_{cyl}, z_K) - F_{frict}(\dot{x}_{cyl}) \quad (19)$$

exerted on the pantograph structure by the cylinder. For its use in active oscillation damping, both the mass $m_{piston}$ of the cylinder piston and the frictional force $F_{friction}$ can be neglected, or added to the passive elements of the seat. With the adjustment law from equation (14) we thus also get a linearized adjustment law for the cylinder force $$\frac{dF_{cyl}}{dt} = A\bar{u} \quad (20)$$

Because of these simplifications, unlike in [7], the parameters of the cylinder acceleration and cylinder jerk, which are only to be measured with difficulty, are not needed as input parameters of the linearized adjustment law, which substantially simplifies its realization.

Furthermore, it must be taken into account that force $F_{cyl}$ of the hydraulic cylinder does not act directly on the seat top, but first must be converted into a vertically acting adjustment force via the pantograph kinematics.

$$F_{adjust}(t) = F_{cyl}(t) u m r_{ZK}(z_A(t)) \quad (21)$$

If it is now presupposed, that $$\frac{d}{dt} F_{adjust}(t) = u(t)$$

applies, then, for the input parameter $\bar{u}$ of the linearized adjustment law from (14), we get:

$$\bar{u}(t) = \frac{1}{A}\frac{dF_{cyl}(t)}{dt} = \frac{1}{A}\frac{\left(u(t) - A p_\Delta(t)\dfrac{d u m r_{ZK}(z_A)}{d z_A}\dot{z}_A(t)\right)}{u m r_{ZK}(z_A(t))} \quad (22)$$

There is thus an integral relationship between the new input parameter $u(t)$ and adjustment force $F_{adjust}(t)$. For stabilizing the system, a force closed-loop control is overlapped with a P-closed-loop controller, so that overall an actuator results with a $PT_1$ behavior, which is moreover uncoupled from the seat movement.

For more cheaply realizing the force closed-loop control, a sensor for measuring the cylinder speed should be omitted. This parameter can be reconstructed, for example, from the measured cylinder length. The velocity thus determined amplifies measuring noise, however, and has a great phase offset. This is why here the setpoint spring excursion velocity of the seat and the setpoint velocity of the cylinder $\dot{x}_{cyl\_setpoint}$ are used as an input parameter of the linearized adjustment laws (14) and (18). The latter is derived via the relationship $$\frac{dF_{adjust}(t)}{dt} \cong u(t) + \frac{(V_A(t) + V_B(t))E_{oil}A^2 u m r_{ZK2}(z_A(t))}{V_A(t)V_B(t)}(\dot{z}_{A setpoint}(t) - \dot{z}_A(t)) \quad (23)$$

$$= u(t) + K(t)(\dot{z}_{A setpoint}(t) - \dot{z}_A(t))$$

with K(t)>0. Feeding-in the setpoint parameters into adjustment laws (14) and (18), thus acts like an additional feed-forward control of the deviation between setpoint and actual spring excursion velocity and thus helps to guide the seat along the setpoint trajectory.

For the experimental investigation on a test arrangement, the force closed-loop controlled synchronous cylinder described in the preceding section is used as an actuator. The time constant of the force closed-loop control was adjusted, as in the simulation in the preceding section, to 70 Hz for the measuring results indicated in table 3. The parameters of the tracking closed-loop control remained the same.

TABLE 3

| | Excitation signal | | | | | | |
|---|---|---|---|---|---|---|---|
| | EWG class II | | | EM3 | | | |
| Amplitude scaling | 50% | 100% | 150% | 100% | 130% | 150% | 180% |
| SEAT value | 0.42 | 0.37 | 0.35 | 0.39 | 0.40 | 0.41 | 0.44 |
| Spring path [mm] | 28 | 60 | 84 | 85 | 90 | 93 | 96 |

Figure 14:
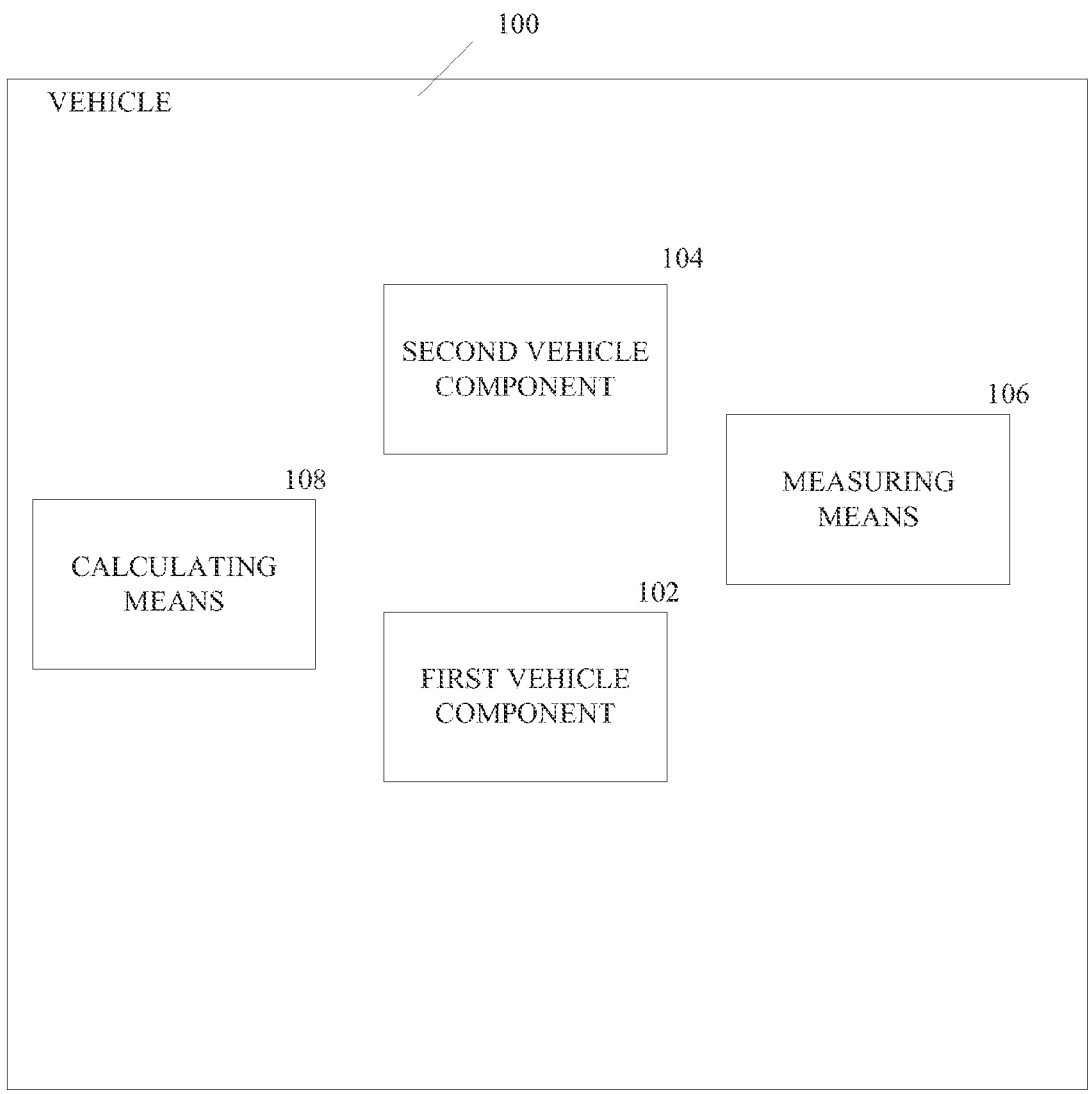
FIG. 14 is a block diagram of a vehicle formed in accordance with an embodiment of the present invention.

FIG. 14 shows the simulation results of the ideal model in the closed-loop controlled seat with a linear actuator, and the measuring results of the active seat with a hydraulic actuator and a passive standard seat. While the spring path requirement of the active systems considered and the ideal model coincide, the SEAT values experimentally determined are substantially above those of the ideal model. A reason for this is that the hydraulic valve used is relatively slow, is dimensioned too large by a factor of at least 5 and is therefore not adapted to the task at hand. Lower values must therefore be expected with an improved choice.

Compared to the standard seat, the active systems need a smaller spring path for all excitations observed. Also the ideal model and the simulated system always have a smaller SEAT value. In particular with strong excitations, the SEAT value is lower by about 40% than that of the standard seat and, at the same time, the spring path requirement is reduced by 30%. Except for one excitation variant (EWG2 100%) the experimentally investigated seat remains below the SEAT value of the standard seat. It achieves an improvement of the SEAT value by up to 25% while at the same time substantially reducing the spring path requirement.

The method according to the present invention with an associated vehicle for devising active oscillation isolation of vehicle seats enables the reaction of the seat to cabin movements and other disturbances to be adjusted independently of each other.

Due to the modular structure of the closed-loop control, only the ideal model has to be adapted when the actively spring-suspended seat is to be used in a different vehicle type. If the seat structure or the actuator structure is to be changed, only the control and the tracking closed-loop control need to be adapted.

Both simulation results and measurements on the test arrangement prove the basic viability of the concept and the advantages of active seat spring suspension over and above passive spring suspension variants.

All features disclosed in the application documents are claimed as essential to the present invention, as far as they are new over and above the state of the art singly or in combination.

As shown in FIG. 14, the core idea of the invention involves, in a vehicle 100 comprising a second vehicle component 104 moveable in an oscillating manner with respect to a first vehicle component 102, and a first measuring means 106 for measuring at least one acceleration measuring value of the first vehicle component with respect to a ground surface, arranging a calculation means 108 for determining an optimum acceleration value of the second vehicle component as a function of the measured acceleration measuring value, wherein at least one actuator is present between the first and second vehicle components, which is provided with a control and closed-loop control unit for minimizing a deviation of a real acceleration value of the second vehicle component from the optimum acceleration value while using an available spring path.

LIST OF REFERENCE NUMERALS

| | |
|---|---|
| 1 | Vehicle seat |
| 3 | Cushion |
| 4, 5 | Pantograph structure |
| 6 | Undercarriage |
| 7 | Damper |
| 8 | Air spring |
| 10 | Seat |
| 11 | Feed-forward control |
| 12, 13 | Position closed-loop controller in the middle position as a setpoint value |
| 20 | Force |
| 21 | Seat top |
| 22 | Cabin |
| 23, 24 | Spring and damper elements |
| 30 | Mass |
| 31 | Mechanical coupling |
| 32 | Spring and damper element |
| 40 | Control unit |
| 41 | Exerted forces |
| 42 | Closed-loop control unit |
| 43 | Real seat excursion |
| 44 | Setpoint value |
| 45 | Further force component |
| 46 | Actuator |
| 47, 60 | Actuator |
| 48 | Force of control |
| 51, 52 | Limiter |
| 61, 62 | Pantograph structure |
| 63 | Seat top |
| 64 | Cabin element |

The invention claimed is:

1. A vehicle comprising:
a first vehicle component;
a second vehicle component, wherein the second vehicle component is moveable with respect to the first vehicle component in an oscillating manner;
at least one actuator arranged between said first and second vehicle components, comprising a control unit and a closed-loop control unit for minimizing a deviation of a real acceleration value of said second vehicle component from an optimum acceleration value by using at least one available spring path,
wherein an optimum excursion $z_{A\ setpoint}$ and an optimum velocity $\dot{z}_{Asetpoint}$ of the second vehicle component with respect to the ground surface is determinable from the optimum acceleration value $\ddot{z}_{Ssetpoint}$ of said second vehicle component, and can be supplied as a control force signal to said actuator by means of said control unit and said closed-loop control unit,
wherein a means for tracking real seat excursion $z_A$ of the second vehicle component with regard to the optimum excursion.

2. The vehicle according to claim 1, wherein said first vehicle component is a vehicle cabin floor and said second vehicle component is a vehicle seat component.

3. The vehicle according to claim 1, wherein calculation means is configured to minimize the real acceleration value.

4. The vehicle according to claim 3, wherein, between said calculating means and said actuator, the closed-loop control unit is arranged to match the real seat excursion $z_A$ to the optimum excursion $z_{A\ setpoint}$ of said second vehicle component by outputting a closed-loop control force signal to said actuator.

5. The vehicle according to claim 1, wherein a sum of a closed-loop control force of said closed-loop control unit and a control force of said control unit results in a setpoint force to be applied of said actuator.

6. A method for spring suspending a vehicle component in a vehicle, the vehicle component having first and second vehicle components, the method comprising:
   oscillating the second vehicle component with respect to the first vehicle component;
   measuring at least one acceleration measuring value of said first vehicle component with respect to a ground surface;
   determining an optimum acceleration measuring value of said second vehicle component as a function of the measured acceleration measuring value,
   minimizing a deviation of a real acceleration value of said second vehicle component from the optimum acceleration measuring value by using at least one available spring path,
   wherein determining, in said calculating means, an optimum excursion $z_{A\ setpoint}$ and an optimum velocity $_{setpoint}$ of said second vehicle component with respect to the ground surface from the optimum acceleration value $_{setpoint}$ of said second vehicle component and feeds the determined values as a control force signal to an actuator by means of a control unit; and
   tracking real seat excursion $z_A$ of the second vehicle component associated with a force with regard to the optimum excursion $z_{A\ setpoint}$.

7. The method according to claim 6, further comprising determining an ideal trajectory for spring oscillating behavior of said second vehicle component for minimizing the real acceleration value.

8. The method according to claim 6, wherein minimizing the deviation of the real acceleration value matches the real seat excursion $z_A$ to the optimum excursion $z_{Asetpoint}$ of said second vehicle component by outputting a closed-loop control force signal to said actuator.

9. The method according to claim 6, wherein the real seat excursion of said second vehicle component is closed-loop controlled to an associated setpoint value as a function of the optimum acceleration value.

10. The method according to claim 6, wherein the optimum acceleration value is adapted to a driving situation of said vehicle.

* * * * *